March 12, 1957  D. W. SHERMAN  2,784,984
COMBINED HITCHING MECHANISM AND TRAILER BEARING SUPPORT
Filed April 21, 1952  3 Sheets-Sheet 1

INVENTOR.
Donald W. Sherman
BY Andrus & Scales
ATTORNEYS.

March 12, 1957     D. W. SHERMAN     2,784,984
COMBINED HITCHING MECHANISM AND TRAILER BEARING SUPPORT
Filed April 21, 1952     3 Sheets-Sheet 2
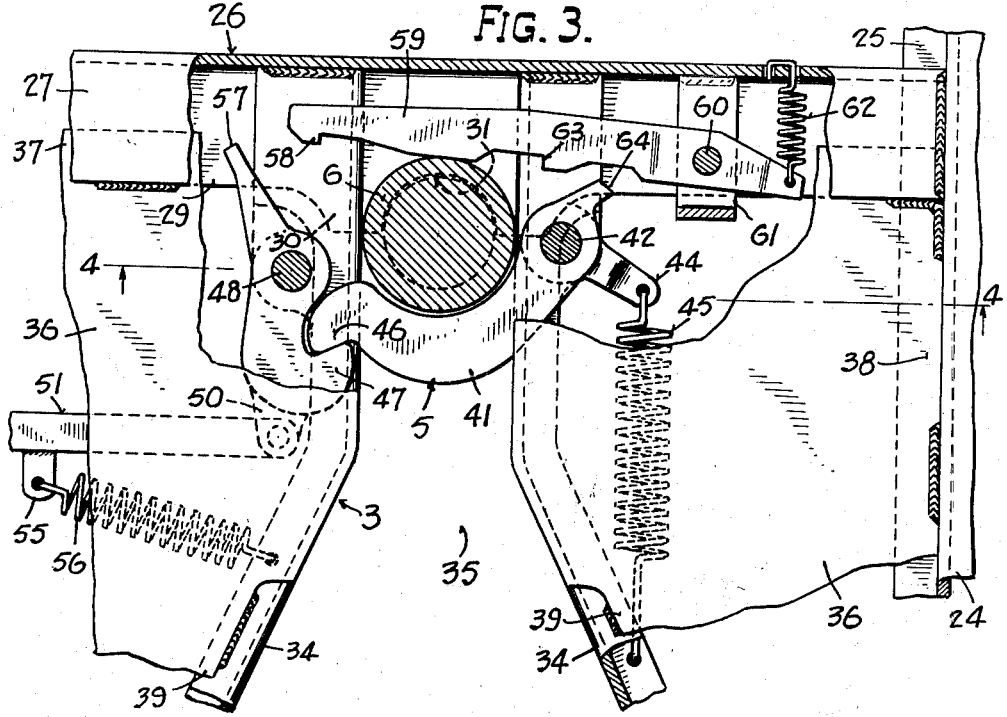
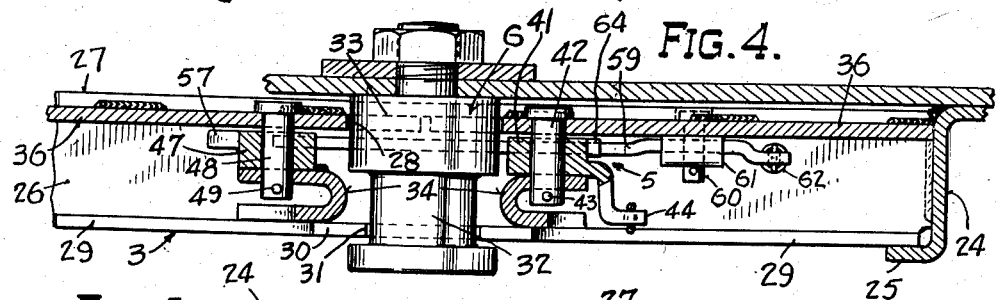
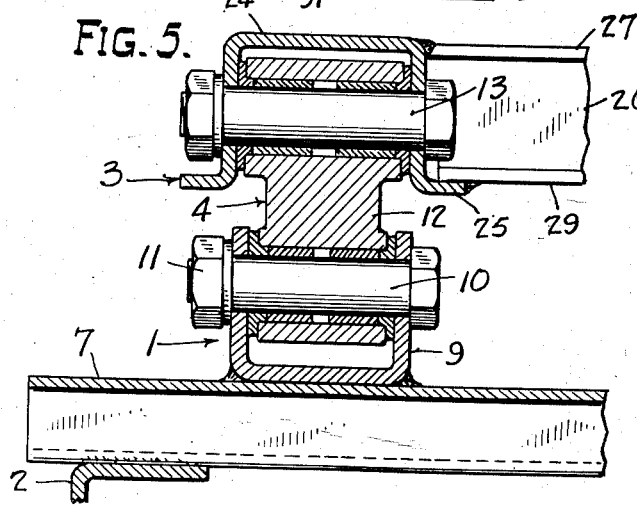
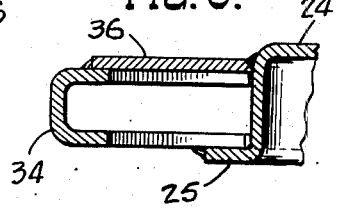
INVENTOR.
Donald W. Sherman
BY *Andrus & Sceales*
ATTORNEYS.

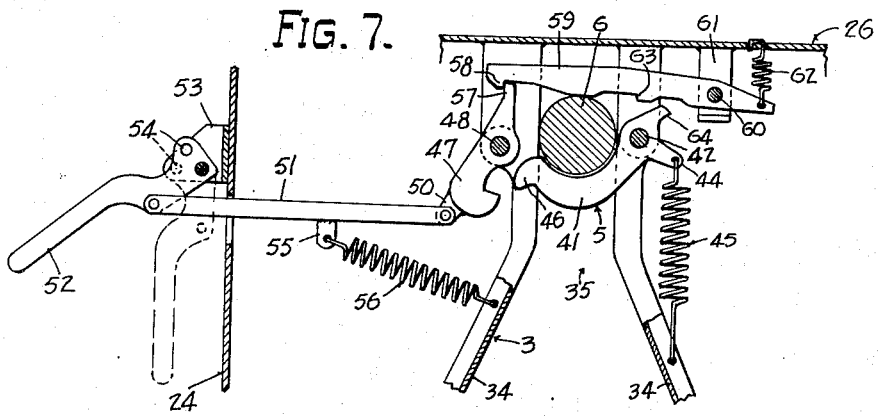
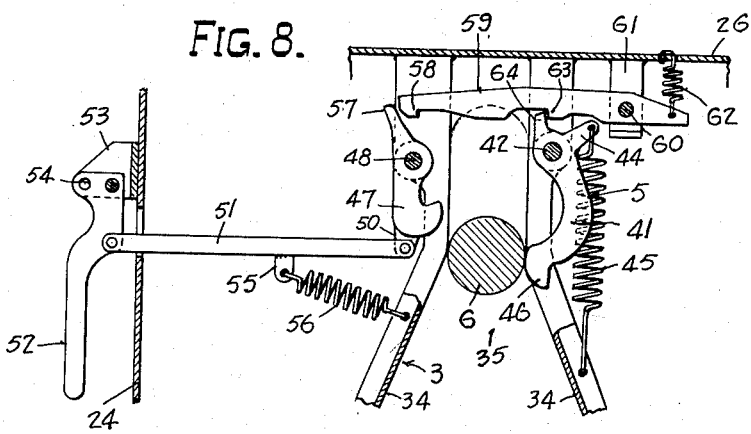
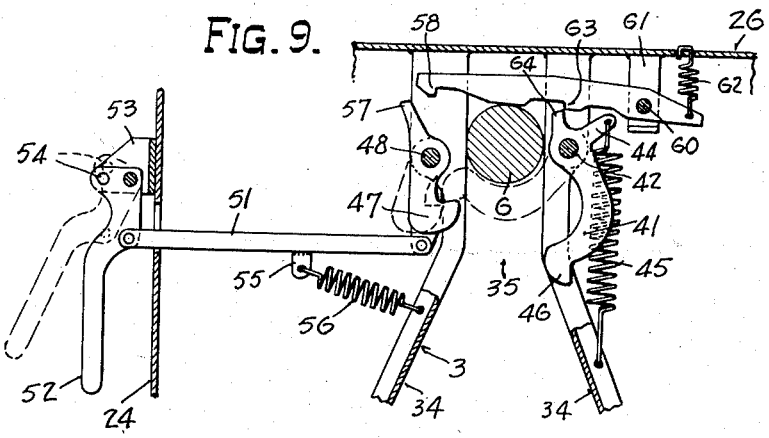

United States Patent Office 2,784,984
Patented Mar. 12, 1957

2,784,984

COMBINED HITCHING MECHANISM AND TRAILER BEARING SUPPORT

Donald W. Sherman, Milwaukee, Wis., assignor to A. O. Smith Corporation, Milwaukee, Wis., a corporation of New York Application April 21, 1952, Serial No. 283,325

3 Claims. (Cl. 280—440)

This invention relates to the combination of a hitching mechanism and a bearing support assembled on the rear of a tractor and adapted to hitch a semi-trailer to the tractor and support the trailer in hitched position.

An object of the present invention is to provide a light weight inexpensive tractor-trailer hitching and supporting apparatus which affords a substantial weight reduction over the ordinary attaching mechanism without sacrificing strength or durability.

Another object of the invention is to provide an improved automatic king pin locking mechanism for a tractor-trailer attaching apparatus which is compact and foolproof.

Still another object is to provide a tractor-trailer attaching mechanism whereby the acceleration and braking forces of the tractor, the coupling impact and also the fore and aft forces caused by travel over rough terrain are effectively cushioned.

Another object is to provide an attaching mechanism for association with a tractor having a trailer supporting surface in the form of a pair of longitudinal ramps rather than a circular wheel.

A further object is to provide a link connection between a tractor and a tiltable trailer support which permits a relatively large pivotal movement and minimizes friction.

The conventional fifth wheel tractor-trailer attachment is basically circular in contour and appears to provide a large bearing area for supporting the trailer. In actuality the fifth wheel is more flexible than the trailer surface with which it is in engagement consequently the wheel does not offer support over the entire surface but rather the bearing areas are local and only over the supports for the wheel.

To take advantage of the fact that the bearing of the trailer is only at the supports for the fifth wheel the present invention incorporates a pair of spaced pressed metal ramps disposed longitudinally of the chassis center line of the tractor along the line of the bearing supports for the trailer. The use of the pressed metal ramps in place of the conventional thick metal circular support affords a substantial weight and momentary saving.

The ramps are connected by a cross member having a central pocket adapted to receive the trailer king pin. Guide rails connected diagonally between the respective ramps and the cross member define a substantially V-shaped entry to the pocket, and a locking mechanism is provided to automatically lock the king pin within the pocket when the same is received therein. Heavy gusset plates interconnect the ramps, cross member and guide rails to provide overall strength for the structure.

Each ramp is pivotally connected to the upper end of a link and the lower end of the link is pivotally attached to the frame of the apparatus. The frame in turn is mounted on the tractor. Rubber bumpers are provided fore and aft of the links to cushion the fore and aft forces present during travel on uneven road surfaces.

The conventional fifth wheel frequently provides cushioning for acceleration, braking and coupling forces. However, the combination of links with rubber bumpers as disclosed in the present invention not only cushions the above named forces but also effectively cushions the fore and aft forces or moments which occur as the rear wheels of the tractor raise and lower when traveling over uneven terrain. This cushioning action prevents wear and noise at the locking mechanism and high stresses in the structure.

Other objects and advantages will appear in the course of the following description.

In the drawings:

Fig. 3 is a fragmentary plan view of the latching mechanism with parts broken away and sectioned;

Fig. 4 is a section taken on line 4—4 of Fig. 3;

Fig. 5 is a section taken on line 5—5 of Fig. 2;

Fig. 6 is a section taken on line 6—6 of Figure 1;

Fig. 7 is a schematic view of the latching mechanism with the latch disengaged from the hook on the jaw and leaving the jaw free to be rotated by the king pin as it moves against the jaw;

Fig. 8 is a view similar to Fig. 7 with the king pin in the withdrawing position; and Fig. 9 is a view similar to Fig. 7 with the king pin in the entered position and the locking jaw released ready to move into the dash line position for latching the king pin in place.

Figure 1:
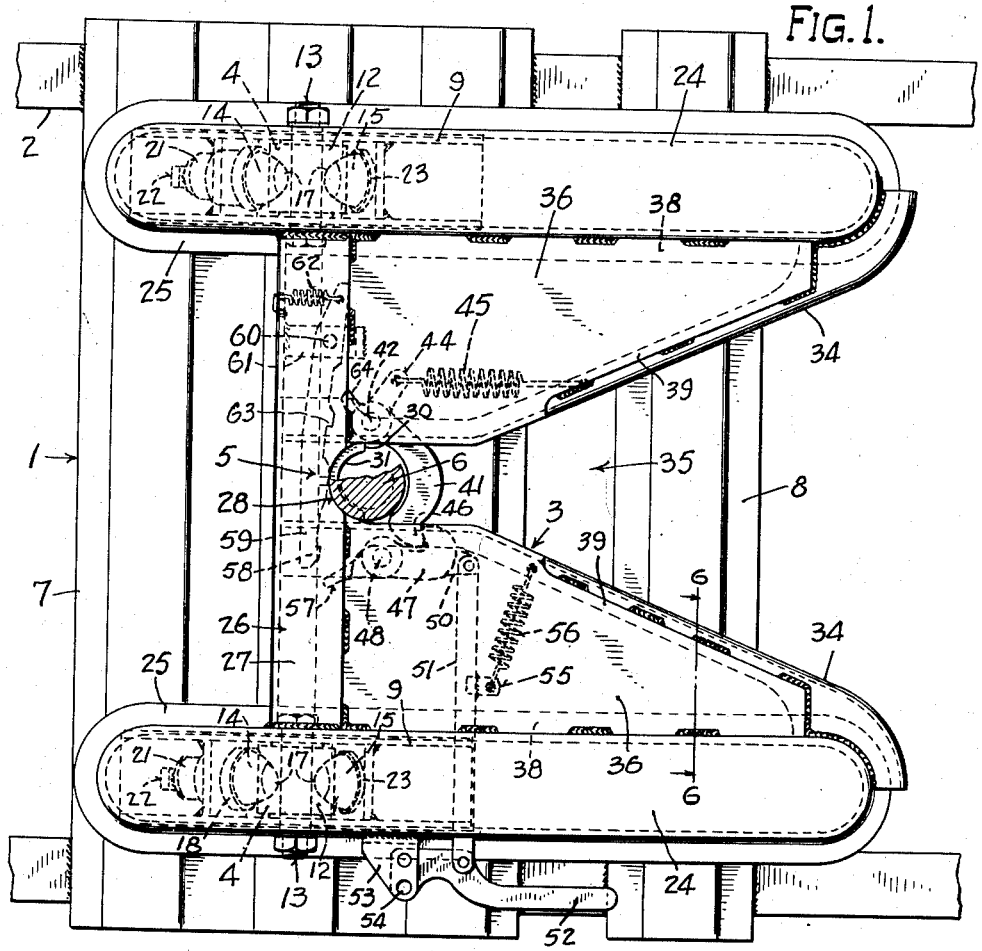
Figure 1 is a top plan view of the device of the invention.

Referring to the drawings, there is shown a tractor-trailer attachment apparatus or fifth wheel which is preferably mounted on the tractor vehicle and comprises, in general, a frame 1 carried on the tractor 2, a tiltable trailer support 3 pivotally connected by a pair of linkages 4 to the frame 1, and a hitching mechanism 5 carried by support 3 to receive and engage the trailer king pin 6.

Frame 1 comprises a corrugated cross plate 7 which is secured to tractor 2 with the corrugations thereof disposed transversely of the chassis of the tractor. A cross-channel 8 is secured to the tractor rearwardly of plate 7 and serves to support the rear end of the tiltable support 3 when the same is in an inclined disengaged position. The term "rearward" as used in the description is contemplated to designate a direction toward the rear end of the tractor. The web portion of channel 8 is upward and is suitably sloped to provide a maximum bearing surface for the inclined support 3.

A pair of U-shaped bearing brackets 9 extend longitudinally over plate 7 in spaced relation to each other and the web portion of each bracket is secured to plate 7. A bearing pin 10 extends through aligned openings in the side flanges of each bracket 9 and is engaged by nut 11 to secure the pin to its respective bracket.

The lower extremity of a link 12 is journaled on each bearing pin 10 within its respective bracket 9 while the upper extremity of each link 12 pivotally supports a bearing pin 13 which is secured to support 3 and on the same vertical plane as pin 10. Each link 12 is disposed for pivotal movement in a longitudinal vertical plane with respect to frame 1.

Rubber bumpers 14 and 15 are obliquely disposed fore and aft respectively of each link 12 and are adapted to contact the downwardly converging side surfaces 16 of the respective links 12. The side surfaces 16 of each link 12 are provided with a circular depression 17 which receives the tip of the corresponding bumper.

The fore bumper 14 is mounted in the head of a mushroom-shaped support 18. The stem portion 19 of support 18 extends diagonally downward and is received within a recess 20 of a fitting 21. Fitting 21 is secured between the side flanges of bearing bracket 9. A preload screw 22 extends diagonally upwardly through a threaded opening in the base of fitting 21 and bears against the lower end of stem 19. Manual adjustment of screw 22 determines the bearing pressure of fore bumper 14 against link 12.

Aft bumper 15 is non-adjustable and is mounted in a cup-like fitting 23 which is secured between the side flanges of bracket 9.

The combination of links 12 and bumpers 14 and 15 provides a simple and effective means of cushioning the acceleration forces, braking forces, coupling impact and also the fore and aft forces caused by travel over rough terrain. The rear wheels of the tractor raise and lower in traveling over uneven ground and the geometry is such that fore and aft moments tends to occur at the coupling connection and the combination of links and rubber bumpers of the present invention effectively cushions these fore and aft forces to prevent wear and noise at the coupling connection as well as preventing high stresses in the entire structure.

The tiltable support 3 comprises a pair of spaced bearing channels or ramps 24 which support the trailer when the same is attached to the tractor. Channels 24 are disposed laterally of and parallel to the longitudinal center line of the tractor chassis with the open side thereof facing downward and the sides of channels 24 are bent outwardly adjacent the edges thereof to provide diverging flanges 25.

Figure 2:
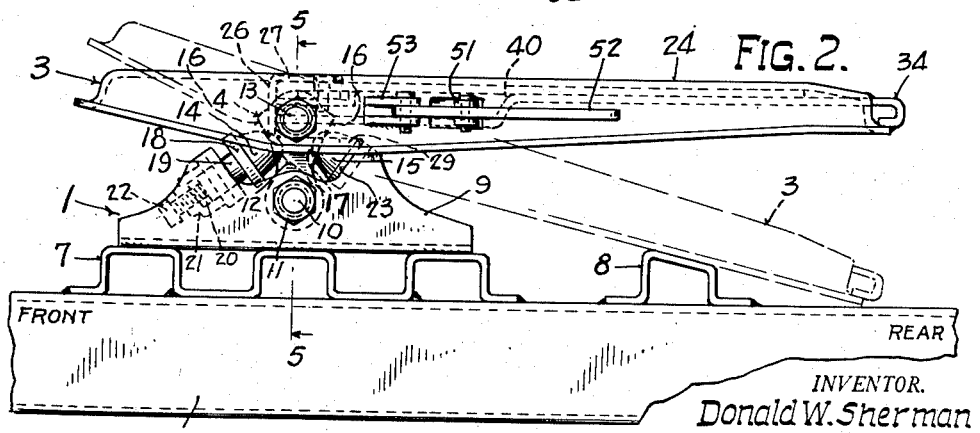
Fig. 2 is a side elevational view of Figure 1.

Bearing pins 13, to which the upper extremities of links 12 are pivotally attached, are secured in the side walls of the respective channels 24 at a line adjacent the forward end thereof so that the channels 24, when not supporting the trailer, will normally be inclined rearwardly, toward the position of approach of the trailer, and rest on cross-channel 8 as shown by dash lines in Fig. 2.

A cross-channel 26 extends between channels 24 with the open side of cross-channel 26 facing rearwardly of the tractor 2 and the ends of channel 26 are welded to channels 24. The upper flange 27 of cross-channel 26 is provided with an arcuate pocket 28 or cut-out at a point vertically above the center line of the tractor chassis.

The outer extremities of bottom flange 29 of cross-channel 26 rest on flanges 25 of the respective bearing channels 24. The edge portion of lower flange 29 is formed with a central projection 30 which is configured to define an arcuate pocket 31 which is concentric with upper pocket 28. However the radius of lower pocket 31 is smaller than upper pocket 28, for pocket 31 is adapted to receive body 32 of trailer king pin 6 while upper pocket 28 receives the larger diameter head 33 of the pin.

A pair of channel-shaped guide rails 34 which are curved to form a V-shaped entry 35 for king pin 6 when assembled together extend between the rear inside portion of bearing channels 24 to the web of transverse channel 26 on both sides of pockets 28 and 31.

In the manner of locating each rail 34 in place the web portion of each rail 34 faces entry 35 and the curved flanges at the rear of each rail are welded to the respective bearing channel 24 with the lower flange of each rail 34 being supported by flange 25 while the forward end of each rail is welded to the web of channel 26. Rail 34 extends diagonally inwardly from the rear end of channel 24 and is curved at a point rearwardly of the pockets 28 and 31 to allow the forward portion of the rail 34 to border the pockets and be substantially parallel to the tractor chassis center line.

A pair of generally triangular gusset plates 36 are disposed between channels 24 and 26 and over guide rails 34. The transverse edge portion 37 of each gusset plate 36 lies under upper flange 27 of cross-channel 26 and is welded thereto while the longitudinal outer edge 38 of each plate 36 abuts the side wall of the corresponding bearing channel 24 and is welded thereto. The inside edge 39 of each gusset plate 36 is shaped in general conformity with the corresponding underlying guide rail 34 and recedes from the web of the rail along most of the diagonally extending part so that the plate may be welded to the upper flange of rail 34. The upper flange of rail 34 flares upwardly along a line to the rearward of the bend in the rail, as indicated by 40 in Fig. 2, and as edge portion 39 of plate 36 is set back from the guiding edge of rail 34 along elevated portion 40 rail 34 will bear the brunt of any blow from king pin 6 as it is guided to pockets 28 and 31 when the tractor is backed toward the trailer.

The longitudinal bearing channels 24 and cross-channel 26 are constructed of pressed metal rather than thick plates as in the conventional fifth wheel. This construction provides a substantial weight saving in the apparatus without sacrificing strength. The present attaching apparatus weighs in the neighborhood of 185 pounds while the usual fifth wheel weighs about 300 pounds. This weight savings can be applied to the pay load of the trailer.

The triangular reinforcing gusset plates 36 provide overall strength along with a strong supporting surface in the event the king pin 6 overrides guide rails 34. If, for some reason, the trailer stands too high for the tractor the king pin is apt to jam against the upper supporting surface of the ordinary fifth wheel during the coupling operation, causing denting or deformation of the supporting surface or wheel. However in the present device, overriding of the king pin 6 will cause the same to jam against one of the plates 36, which are designed to withstand the concentrated load of the trailer. Damage to plates 36 by king pin 6 is of little consequence for the trailer is supported by channels 24 rather than by plates 36.

The hitching mechanism 5 comprises a generally curved pin retaining jaw 41 which is disposed to the rear side of king pin 6 and adapted to retain the king pin within pockets 28 and 31. One end of jaw 41 is pivotally mounted on the vertically disposed pin 42 which extends through aligned openings in the upper flange of the right guide rail 34, as viewed in Figs. 3 and 4, and the corresponding gusset plate 36. The head of pin 42 bears against the top surface of plate 36 and a small locking pin 43 extends horizontally through the lower end of pin 42 beneath the upper flange of rail 34 to retain pin 42 in place.

Jaw 41 is provided with a downwardly and outwardly extending arm 44 which is connected to one end of a spring 45. The other end of spring 45 is secured to guide rail 34 and the spring serves to urge jaw 41 to the closed position.

The outer end of jaw 41 is provided with a hook 46 which is adapted to be engaged by a hook on the end of latch 47 on the left side of the king pin to lock the jaw 41 in the closed position. Latch 47 is pivotally mounted on a pin 48 which extends through aligned openings in the upper flange of the left guide rail 34, as viewed in Figs. 3 and 4 and the corresponding gusset plate 36. The head of pin 48 bears against plate 36 and a small locking pin 49 extends horizontally through the lower end of the pin 48 beneath the upper flange of rail 34 to retain pin 48 in place.

The back of the hook of latch 47 has an ear 50 which is pivotally connected to a rod 51 that extends transversely of tractor chassis 2 from latch 47 through suitable aligned openings in the side walls of the left bearing channel 24, as viewed in Fig. 3, to a point external of the tiltable support 3. The outer end of rod 51 is pivoted to handle 52 which lies flatwise, the forward end of the handle being pivoted within U-shaped bracket 53 which is welded to the outer flange of channel 24. Aligned openings 54 are provided in bracket 53 and handle 52 for the insertion of a padlock or other locking device to prevent accidental pulling of handle 52 and unlocking of latch 47 after coupling has been established.

A lug 55 is secured to the central portion of rod 51, and one end of a spring 56 is connected to the lug 55 while the other end of the spring is attached to left guide rail 34. Spring 56 serves to bias rod 51 inwardly, toward jaw 41, and thereby urges latch 47 into locking engagement with the hook 46 of jaw 41.

The end 57 of latch 47 opposite ear 50 is adapted to engage the rearwardly extending hook 58 formed in the end of a lever 59 when latch 47 is pivoted about pin 48 by normal operation of handle 52 acting through rod 51. By pulling rod 51 outwardly by means of handle 52, latch 47 is pivoted clockwise out of engagement with jaw 41, and latch end 57 is held by abutment 58 as the latch rotates to lock latch 47 in the open position, out of engagement with jaw 41 as shown in Fig. 7.

Lever 59 extends horizontally between the flanges of cross-channel 26 beneath gusset plates 36 and transversely of the tractor chassis. The right end portion of lever 59, as seen in Figs. 3 and 4, is pivoted to a pin 60 which is journaled in plate 36 and bracket 61, the bracket 61 being welded endwise to the web of cross-channel 26 and extending outwardly therefrom toward the rear of the tractor. One end of a spring 62 is attached to the right end of lever 59, and the other end of spring 62 is connected to the web of cross-channel 26, the force of the spring tending to pivot lever 59 counterclockwise about pin 60.

When lever 59 is in its normal spring biased position, the rearward edge portion of lever 59 adjacent pockets 28 and 31 rests within the pockets as shown in Fig. 8.

The central portion of the rearward edge of lever 59 is provided with an abutment 63 which is adapted to engage and hold an outwardly extending ear 64 of jaw 41 disposed in the same horizontal plane as lever 59. As jaw 41 is pivoted counterclockwise against spring 45 by the withdrawal of king pin 6 from pockets 28 and 31, as shown in Fig. 8, ear 64 contacts lever 59 and engages abutment 63 to maintain jaw 41 in the open position.

The operation of the hitch or coupling apparatus of the invention is as follows: The attaching apparatus of the present invention is preferably mounted on the tractor 2 and the tiltable support 3 is in its normal inclined position at the start of the coupling operation. The tractor is backed toward the trailer so that the king pin 6 enters the V-shaped entry 35 and is guided toward pockets 28 and 31 by rails 34.

As previously related, gusset plates 36 are of a substantial thickness to bear the concentrated load of the trailer should king pin 6 override guide rails 34 and jam against plates 36.

At the start of the coupling operation jaw 41 is held in the open position against the force of spring 45, as shown in Fig. 8, by engagement of ear 64 with abutment 63 and is disposed immediately above guide rail 34 in a position where it will not obstruct the entry of king pin 6 into pockets 28 and 31. At the same time rearward edge portion of lever 59 protrudes rearwardly into pockets 28 and 31 and latch 47 is biased to the inward or locking position thereof by spring 56.

As tractor 2 continues to move rearwardly king pin 6 is received within pockets 28 and 31 and contacts lever 59 pushing the same forwardly and causing lever 59 to pivot clockwise about pin 60, as shown in Fig. 9. Clockwise movement of lever 59 causes disengagement of jaw ear 64 from abutment 63. Jaw 41 is thereby released and is pivoted clockwise to the closed position by the force of spring 45 acting through arm 44 of the jaw. As jaw 41 rotates, hook 46 thereof contacts the hooked latch 47 and pivots the same outwardly as shown by the dash lines in Fig. 9. Jaw 41 moves past latch 47 to the closed position and the tension of spring 56 urges latch 47 inwardly to a locking engagement with latch 47 as shown in Fig. 3. This action completes the coupling operation and the king pin is securely retained within pockets 28 and 31 by jaw 41 which is locked in the retaining or closed position by latch 47.

To uncouple the trailer from the tractor, handle 52 is pulled outwardly, as shown in Fig. 7, causing a resultant outward movement of rod 51 against the force of spring 56 and unlatching of latch 47 from hook 46.

As latch 47 pivots clockwise, leg 57 moves into contact with the cam end of lever 59 thereby pivoting lever 59 clockwise until the tip of leg 57 engages abutment 58. The engagement of leg 57 with abutment 58 maintains latch 47 in the open position out of locking connection with jaw 41.

With latch 47 disengaged from jaw 41 the tractor is moved forwardly causing king pin 6 to bear against jaw 41 and pivot the same counterclockwise to the open position thereof, as shown in Fig. 8.

As jaw 41 is pivoted counterclockwise by king pin 6, ear 64 of jaw 41 is brought into contact with lever 59 and pivots the same clockwise about pin 60 against the force of spring 62. As the lever is pivoted by ear 64, leg 57 of latch 47 is released from abutment 58 and latch 47 is pivoted counterclockwise to the closed position thereof by the force of spring 56, as shown in Fig. 8.

Continued counterclockwise rotation of jaw 41 by the removal of king pin 6 causes ear 64 to engage abutment 63 in lever 59 and, as lever 59 is biased rearwardly by spring 62, this engagement of ear 64 and abutment 63 locks jaw 41 in the open position. When ear 64 engages abutment 63, the lever is urged counterclockwise by spring 62 with the rearward edge of lever 59 then projecting into pockets 28 and 31. Jaw 41 and lever 59 are now positioned for another coupling operation.

The locking mechanism of the present apparatus automatically couples the trailer to the tractor without the need of any manual preparatory operation. By manually releasing latch 47 by means of handle 52 the tractor can be withdrawn and the uncoupling completed, and the mechanism is automatically set for the next coupling operation.

The invention provides a light weight support for the trailer at the bearing areas which is only reinforced along the guide slot leading to the latching mechanism.

Various embodiments of the invention may be employed within the scope of the accompanying claims.

I claim:

1. In a trailer bearing support assembly provided on the rear of the frame of a tractor, a frame mounted on the rear of the tractor frame, a pair of transversely spaced linkage members pivotally connected to the frame for pivotal movement in a longitudinal vertical plane with respect to the frame and extending upwardly therefrom, resilient bumper means on the frame disposed fore and aft respectively of each linkage member and contacting the side surfaces of the latter to cushion the fore and aft moments incident on the assembly, a pair of spaced ramp-like downwardly opening channel members extending longitudinally of the tractor frame and joined integrally by a transversely extending cross member, said members being tiltably mounted at their upper ends upon said linkage members and providing bearing surfaces for supporting a trailer in hitched position, and guide means reinforcing said channel members and cross member and secured thereto to guide the kingpin of a trailer into the hitching position.

2. In a fifth wheel assembly for connecting a trailer and a tractor together, a frame mounted on the rear of the tractor and including transversely spaced upwardly extending bracket members, a linkage member having the lower end thereof pivotally connected to each bracket member for pivotal movement with respect to the respective bracket members and in a longitudinal vertical plane with respect to the frame, resilient bumper means connected to the frame and disposed fore and aft respectively of each linkage member and contacting the side surfaces of the latter to cushion the fore and aft moments incident on the assembly, a pair of transversely spaced and integrally joined bearing members pivotally mounted at the upper ends upon said linkage members and disposed longitudinally of the tractor frame for supporting a trailer in hitched position, and a guide member formed integrally with each bearing member, said guide members converging forwardly and being adapted to receive and guide the trailer kingpin therebetween into the hitching position.

3. In a trailer bearing support assembly provided on the rear of the frame of a tractor, a frame mounted on the rear of the tractor and including a pair of transversely spaced and upwardly extending bracket members, a linkage member pivotally connected to each bracket member for pivotal movement in a longitudinal vertical plane with respect to the frame and extending upwardly therefrom, resilient bumper means connected to each bracket member fore and aft of each linkage member and contacting the side surfaces of the latter to cushion the fore and aft moments incident on the assembly, a pair of transversely spaced ramp-like downwardly opening channel members extending longitudinally of the tractor frame, a cross member extending between the spaced channel members and integrally joining said members adjacent the forward end thereof, said channel members and cross member being tiltably mounted to the upper ends of said linkage members and providing bearing surfaces for supporting a trailer in hitched position, a pair of transversely spaced guide rails extending rearwardly from the cross member in outwardly diverging relation and connecting the corresponding channel member to the cross member and forming a pocket intermediate the channel members and adjacent to the cross member between the guide rails, said rearwardly diverging guide rails being adapted to receive a trailer kingpin therebetween and guide the kingpin into said pocket for securement, and reinforcing means extending between each guide rail and the corresponding channel member.

References Cited in the file of this patent

UNITED STATES PATENTS

| | | |
|---|---|---|
| 1,634,945 | Judd | July 5, 1927 |
| 1,892,797 | Davis | Jan. 3, 1933 |
| 1,958,723 | Spencer | May 15, 1934 |
| 1,981,233 | Harris | Nov. 20, 1934 |
| 2,041,124 | Francis | May 19, 1936 |
| 2,053,132 | Connors | Sept. 1, 1936 |
| 2,140,990 | Emrick | Dec. 20, 1938 |
| 2,196,537 | Sherman | Apr. 9, 1940 |
| 2,357,672 | Lee et al. | Sept. 5, 1944 |
| 2,391,372 | Weigand | Dec. 18, 1945 |
| 2,402,254 | Maddock et al. | June 18, 1946 |
| 2,426,002 | Den Besten et al. | Aug. 19, 1947 |
| 2,440,152 | Norman et al. | Apr. 20, 1948 |
| 2,618,488 | Ketel | Nov. 18, 1952 |

FOREIGN PATENTS

| | | |
|---|---|---|
| 564,371 | Germany | Nov. 18, 1932 |